(12) United States Patent
Oldham (10) Patent No.: US 7,764,378 B2
(45) Date of Patent: *Jul. 27, 2010

(54) METHODS FOR IMPROVING THE PERFORMANCE OF A DETECTOR

(75) Inventor: Mark F. Oldham, Los Gatos, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/138,151

(22) Filed: Jun. 12, 2008

(65) Prior Publication Data

US 2008/0240529 A1    Oct. 2, 2008

Related U.S. Application Data

(63) Continuation of application No. 11/208,970, filed on Aug. 22, 2005, now Pat. No. 7,388,664.

(51) Int. Cl.
*G01J 3/51* (2006.01)
*C12M 1/34* (2006.01)

(52) U.S. Cl. .............. 356/417; 435/287.2; 435/288.7

(58) Field of Classification Search .............. 356/417
See application file for complete search history.

(56) References Cited

U.S. PATENT DOCUMENTS 7,388,664 B2 * 6/2008 Oldham ............... 356/417
2005/0056768 A1   3/2005 Oldham et al.

OTHER PUBLICATIONS

International Search Report dated Feb. 19, 2008 for International application No. PCT/US2006/31347, along with Written Opinion of the International Searching Authority.

* cited by examiner

*Primary Examiner*—F. L Evans (57) ABSTRACT

A system and method for allowing adjustments of various parameters associated with the operation of charge-coupled devices adapted for use in biological analysis devices. Gate voltage signal applied to the CCDs can be adjusted to advantageously affect the manner in which charge is transferred from pixels. The manner in which transferred charges from the pixels are processed in a readout process can also be adjusted to advantageously change the speed of the CCD based detector. Various methods of performing such adjustments are disclosed.

4 Claims, 10 Drawing Sheets

METHODS FOR IMPROVING THE PERFORMANCE OF A DETECTOR

CROSS-REFERENCE TO RELATED APPLICATION

This application is a continuation of U.S. patent application Ser. No. 11/208,970 filed Aug. 22, 2005, which is incorporated herein by reference.

BACKGROUND

1. Field

The present teachings generally relate to the field of signal processing and more particularly, to a system and methods for improving the performance of detectors associated with signal imaging in biological analysis.

2. Description of the Related Art

During biological analysis, such as nucleotide sequencing or microarray processing, photo-detectors such as charge coupled devices (CCD) may be used to detect signals arising from labeled samples or probe features responsive to selected target analytes. These signals may take the form of fluorescent or visible light emissions that are desirably analyzed to quantify signal intensities arising from each labeled sample or probe feature and are subsequently resolved to quantitatively or qualitatively evaluate the presence of a target analyte within a sample.

Generally, a CCD used in such a biological analysis comprises an array of signal detecting pixels. The signal detection for a given pixel can be characterized as a conversion of an incident electromagnetic energy signal into a number of electron-hole pairs. The pixel may be configured to collect either the electrons or the holes thus generated with the number of collected charges representative of the incident energy. A CCD having a plurality of such pixels with collected charges can be read out by a sequence of shifting operations by applying a sequence of gate voltages to the pixels in a predetermined manner. The charge collected from a selected pixel can then be read out or quantitated and used for further analysis.

The operation of the CCD in the foregoing manner is facilitated by a plurality of operating parameters. In a conventional biological analysis system, these CCD operation parameters are generally set when a user receives the system. Although the set parameters may be generally suitable for the intended application of the CCD, they typically do not cover every possible analysis situations. Thus, the generally fixed configurations of certain CCD operating parameters may limit the manner in which the CCD is used in the biological analysis. Consequently, there is an ongoing need for an improved approach to the manner in which CCDs are used in biological analysis systems.

SUMMARY

One aspect of the present teachings relates to a system for interrogating a sample using a probe array configured to be responsive to a plurality of particles. The probe array generates one or more identifiable signals following interaction with the sample particles. The sample composition is resolved, at least in part, by identifying the signals associated with each constituent probe of the array. The system comprises a segmented detector configured to detect at least a portion of the one or more identifiable signals associated with the constituent probes of the probe array. The position of each constituent probe and the signal arising therefrom are used to identify the presence or absence of particles contained within the sample. The segmented detector comprises a plurality of pixels adapted to collect charges generated in response to the one or more identifiable signals. The magnitude of the collected charge in a given pixel is representative of the intensity of the one or more identifiable signals impinging on the given pixel. The pixel is adapted to allow transferring of the collected charge by an application of one or more gate voltages to the pixel. The system further comprises a clock driver that provides the one or more gate voltages to the pixel. The manner in which the gate voltages are applied to the pixel affects the manner in which the collected charge is transferred from the pixel. The system further comprises a readout component that reads out the charges transferred out from the pixels to thereby yield an output signal corresponding to each pixel wherein the output signal is representative of the magnitude of the pixel's collected charge. The system further comprises a controller configured to control at least one of the clock driver and the readout component so as to allow selective adjustment of the manner in which the gate voltages is applied to the pixel or the manner in which the readout occurs. The controller being able to control the manner in which the detector operates facilitates an improved flexibility in which the system is configured for a given analysis application thereby providing an improved position information of the constituent probes of the probe array thereby allowing improved identification of the presence or absence of particles contained within the sample.

In certain embodiments, the clock driver comprises a gate voltage generator and a clock. The clock provides a clock signal to the gate voltage generator and the gate voltage generator in response generates the gate voltage signals to the pixels. In one embodiment, the gate voltage generator includes an adjustment component that adjusts the amplitude of the gate voltage signals. In one embodiment, the gate voltage generator comprises a power supply and a digital-to-analog converter (DAC). The DAC receives a digital adjustment signal from the controller, converts the adjustment signal to an analog amplitude adjustment signal, and supplies the analog amplitude adjustment signal to the power supply such that the DAC allows the controller to adjust the amplitude of the gate voltage signals. In one embodiment, the gate voltage generator comprises a power supply and an electrically erasable potentiometer (EEPOT). The power supply provides a selected amplitude gate voltage signal to the EEPOT. The EEPOT under the control of the controller adjusts the selected amplitude of the gate voltage such that the adjusted gate voltage signal put out by the EEPOT has a desired amplitude. In one embodiment, the gate voltage generator includes an analog multiplexer that provides a plurality of analog output voltage signals so that one of such signals can be selected as a source of the gate voltage.

In certain embodiments, the clock driver includes an adjustment component that adjusts one or more temporal parameter associated with the gate voltage signals. In one embodiment, the adjustment component adjusts the duration of the gate voltage by adjusting the number of clock signal cycles that defines the gate voltage duration. In one embodiment, the adjustment component adjusts the duration of the gate voltage by adjusting the period of the clock signal. In one embodiment, the adjustment component comprises a clock signal adjustment component that adjusts the period of the clock signal.

In certain embodiments, the readout component comprises an adjustment component that adjusts one or more parameters that affect the manner in which the readout occurs. In one embodiment, the adjustment component comprises a radio-frequency interference (RFI) filter configured to be controlled by the controller so as to adjust the manner in which it filters a clock signal from a clock. The adjustment of the filtering affects the manner in which reset gate signals reset a charge detector circuit of the readout component. In one embodiment, the filtering is adjusted so that the charge detector's reset time is reduced thereby increasing the rate at which the readout cycle operates.

In certain embodiments, the readout component includes an electron multiplier having plurality of gain settings. In one embodiment, the gain of the electron multiplier can be adjusted with respect to the rate at which the readout cycle operates.

In certain embodiments, the readout component includes an anti-bloom component and a switching component. In one embodiment, the switching component allows the anti-bloom component to be turned on or off.

Another aspect of the present teachings relates to a method for improving the performance of a segmented detector of a biological analysis system having an array of biological probes positioned on an analysis platform. Each probe is configured to be responsive to a specific particle having unique identifying characteristics. When the array of probes is exposed to the sample, the probes generate an identifiable signal based on the interaction of the probes with specific particles within the sample based upon the unique identifying characteristics of the specific particle. The identifiable signals from the array of probes are captured by the plurality of pixels so as to form the image of the array of probes. Each pixel detects the detectable signal by collecting charge induced by the interaction of the detectable signal with the pixel. The output signal from the pixel is obtained by transferring the collected charge to an output register and reading out the output register. The method comprises adjusting one or more parameters associated with the charge transfer process or the readout process. The parameters that affect the performance of the charge transfer process include the amplitude and duration of gate voltage signals provided to the pixel. The parameters that affect the performance of the readout process include the duration of a reset process that occurs between detection of charges associated with the pixels. The method further comprises performing the detection and reading out of the resulting charges with the adjustment of one or more parameters in effect. Such an adjustment improves the manner in which the detector is used for a given application of the biological analysis system to thereby allow improved identification of the specific particles within the sample.

In certain implementations, adjusting one or more parameters comprises adjusting the amplitude of the gate voltage. In one implementation, adjusting the amplitude of the gate voltage comprises adjusting the manner in which a gate voltage generator operates. In one embodiment, the gate voltage generator includes a power supply and a digital-to-analog converter (DAC). The DAC receives a digital adjustment signal from a controller, converts the adjustment signal to an analog amplitude adjustment signal, and supplies the analog amplitude adjustment signal to the power supply such that the DAC allows the controller to adjust the amplitude of the gate voltage. In one embodiment, the gate voltage generator includes a power supply and an electrically erasable potentiometer (EEPOT). The power supply provides a selected amplitude gate voltage signal to the EEPOT. The EEPOT under the control of a controller adjusts the selected amplitude of the gate voltage such that the adjusted gate voltage signal put out by the EEPOT has a desired amplitude. In one embodiment, the gate voltage generator includes an analog multiplexer that provides a plurality of analog output voltage signals so that one of such signals can be selected as a source of the gate voltage.

In certain implementations, adjusting one or more parameters comprises adjusting the duration of the gate voltage. In one implementation, the gate voltage duration is adjusted by adjusting the number of clock signal cycles that defines the gate voltage duration. In one implementation, the gate voltage duration is adjusted by adjusting the period of a clock signal that induces the gate voltage generation.

In certain implementations, adjusting one or more parameters comprises adjusting the duration of the reset process. In one implementation, the duration of the reset process is adjusted by adjusting the filtering of a radio-frequency interference filter that filters a clock signal that drives the reset process for resetting a charge detector circuit that detects the transferred charge from the pixel. In one implementation, the filtering is adjusted so that the charge detector circuit's reset time is reduced thereby increasing the rate at which the readout cycle operates.

In certain implementations, adjusting one or more parameters comprises adjusting the gain of an electron multiplier with respect to the rate at which the readout process operates.

In certain implementations, adjusting one or more parameters comprises switching between an anti-bloom mode or operation and a full well mode of operation.

DETAILED DESCRIPTION OF CERTAIN EMBODIMENTS

These and other aspects, advantages, and novel features of the present teachings will become apparent upon reading the following detailed description and upon reference to the accompanying drawings. In the drawings, similar elements have similar reference numerals.

Figure 1A:
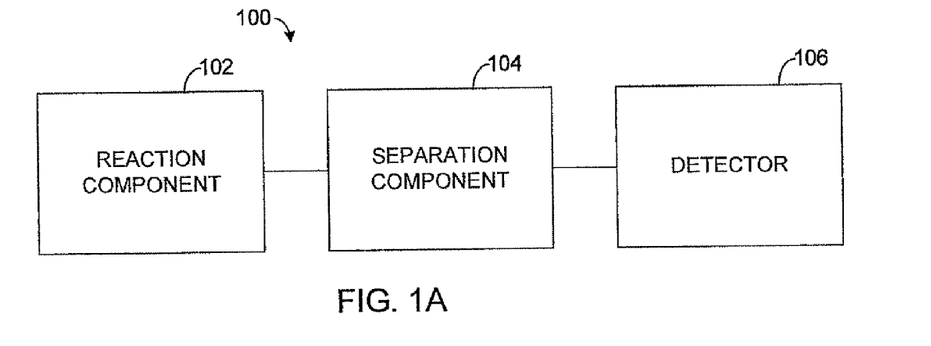
FIG. 1A illustrates a functional block diagram of a system adapted to measure components associated with biological related processes.

FIG. 1A illustrates an exemplary schematic diagram for a biological analyzer 100 capable of sequence determination or fragment analysis for nucleic acid samples. In various embodiments, the analyzer 100 may comprise one or more components or devices that are used for labeling and identification of the sample and may provide means for performing automated sequence analysis. The various components of the analyzer 100, described in greater detail hereinbelow, may comprise separate components or a singular integrated system. It will be appreciated that the present teachings may be applied to both automatic and semi-automatic sequence analysis systems as well as to methodologies wherein some of the sequence analysis operations are manually performed. Additionally, the methods described herein may be applied to other biological analysis platforms to improve the overall quality of the analysis.

In various embodiments, the methods and systems of the present teachings may be applied to numerous different types and classes of photo and signal detection methodologies and are not necessarily limited to CCD-based detectors. Additionally, although the present teachings are described in various embodiments in the context of sequence analysis, these methods may be readily adapted to other devices/instrumentation and used for purposes other than biological analysis.

It will also be appreciated that the methods and systems of the present teachings may be applied to photo-detectors in general for a variety of applications, some of which are listed as examples above. Photo-detectors in general convert incident photons to electrical signals, and may include, by way of example, CCDs, photomultipliers, or semiconductor based devices such as photo-diodes.

In the context of sequence analysis, the exemplary sequence analyzer 100 may comprise a reaction component 102 wherein amplification or reaction sequencing (for example, through label or marker incorporation by polymerase chain reaction) of various constituent molecules contained in the sample is performed. Using these amplification techniques, a label or tag, such as a fluorescent or radioactive dideoxy-nucleotide may be introduced into the sample constituents resulting in the production of a collection of nucleotide fragments of varying sequence lengths. Additionally, one or more labels or tags may be used during the amplification step to generate distinguishable fragment populations for each base/nucleotide to be subsequently identified. Following amplification, the labeled fragments may then be subjected to a separation operation using a separation component 104. In one aspect, the separation component 104 comprises a gel-based or capillary electrophoresis apparatus which resolves the fragments into substantially discrete populations. Using this approach, electrical current may be passed through the labeled sample fragments which have been loaded into a separation matrix (e.g. polyacrylamide or agarose gel). The application of an electrical current results in the migration of the sample through the matrix. As the sample migration progresses, the labeled fragments are separated and passed through a detector 106 wherein resolution of the labeled fragments is performed.

In one aspect, the detector 106 may identify various sizes or differential compositions for the fragments based on the presence of the incorporated label or tag. In one exemplary embodiment, fragment detection may be performed by generation of a detectable signal produced by a fluorescent label that is excited by a laser tuned to the label's absorption wavelength. Energy absorbed by the label results in a fluorescence emission that corresponds to a signal measured for each fragment. By keeping track of the order of fluorescent signal appearance along with the type of label incorporated into the fragment, the sequence of the sample can be discerned. A more detailed explanation of the sequencing process is provided in commonly assigned U.S. Pat. No. 6,040,586, entitled "Method and System for Velocity-Normalized Position-Based Scanning" which is hereby incorporated by reference in its entirety.

Figure 1B:
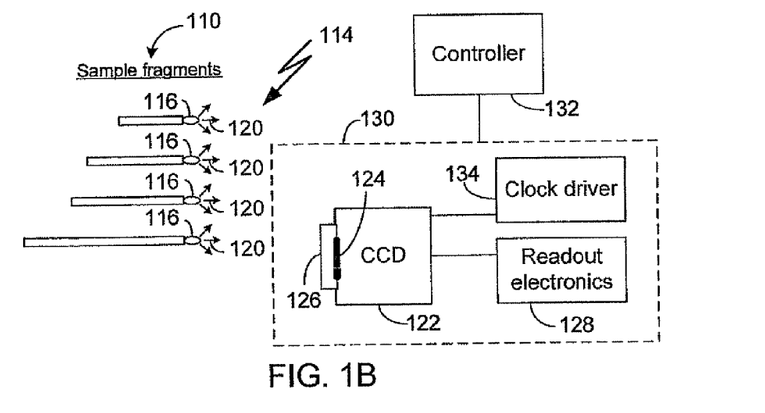
FIGS. 1B and C illustrate exemplary biological analysis systems that utilize CCDs to detect signals from samples adapted to emit electromagnetic energy in a selected manner.

FIG. 1B illustrates exemplary components for a detector 130 which may be used to acquire the signal associated with a plurality of labeled fragments 110. As previously indicated, the labeled fragments 110 may be resolved by measuring the quantity of fluorescence or emitted energy generated when the fragments 110 are subjected to an excitation source 114 of the appropriate wavelength and energy (e.g. a tuned laser). The energy emissions 120 produced by a label 116 associated with the fragments 110 may be detected using a charge-coupled device (CCD) 122 as the fragments 110 pass through a detection window 126 wherein a plurality of energy detecting elements (e.g., pixels) 124 capture at least a portion of the emitted energy from the label 116. In one aspect, an electronic signal is generated by the CCD 122 that is approximately proportional to the relative abundance of the fragments 110 passing through the detection window 126 at the time of energy capture and the order which the fragments 110 appear in the detection window 126 may be indicative of their relative length with respect to one another.

A readout electronics assembly 128 is configured to perform readout operations to acquire the electronic signal generated by the CCD 122 in response to the fragments 110. In various embodiments, some of the information that may be determined through signal readout and subsequent resolution and peak identification may include determination of the relative abundance or quantity of each fragment population. Evaluation of the signals may further be used to determine the sequence or composition of the sample using various known base sequence resolution techniques. It will further be appreciated by one of skill in the art that the exemplified signal distribution may represent one or more nucleic acid fragments for which the relative abundance of each fragment may be evaluated based, in part, upon the determination of the relative area of an associated peak in the signal distribution. The present teachings may therefore be integrated into existing analysis approaches to facilitate peak evaluation and subsequent integration operations typically associated with sequence analysis.

In various embodiments, the readout of the signal from the CCD 122 and selected control of the CCD 122 may be advantageously performed by a controller 132. The controller 132 may be configured to operate in conjunction with one or more processors and/or one or more other controllers. Such controller and processor's components may include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables. Furthermore, the controller 132 may output a processed signal or analysis results to other devices or instrumentation where further processing may take place.

In one aspect, the present teachings relates to a clock driver 134 that provides various clocked signals to the CCD 122 and/or the readout 128 so as to allow coordination of the manner in which charge is collected and read out from the CCD. The clock driver 134 may be configured to be controllable by the controller 132 such that the various clocked signals can be advantageously adjusted to suit the operating parameters of a given biological analysis system. Some of the possible manners in which the signals can be adjusted are described below in greater detail. Such a capability to adjust some of the operating parameters of the CCD can provide a significant advantage over conventional biological analysis systems where the operating parameters of the CCD and the related components are typically fixed when installed in the analysis system.

Figure 1C:
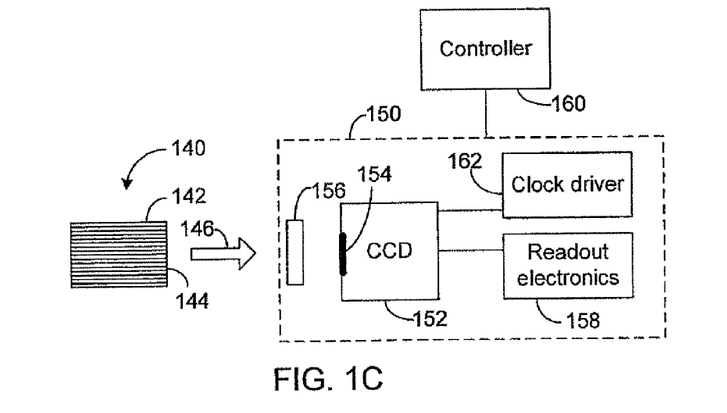

FIG. 1C illustrates another configuration of exemplary components for a detector 150 which may be used to acquire the signals associated with a plurality of labeled fragments forming an array, microarray, or biochip assay. One exemplary configuration of an array used in biological analysis may comprise a plurality of labeled fragments configured to adhere selectively to an array of tips 144 of a plurality of fibers 142. Such an array type of sample platform 140 may be utilized to simultaneously characterize concentrations of different types of fragments present in a sample. As previously indicated, the labeled fragments attached to the fiber tips 144 may be resolved by measuring the quantity of fluorescence or emitted energy generated when the fragments are subjected to an excitation source of the appropriate wavelength and energy (e.g. a tuned laser). The energy emissions 146 produced by a label associated with the fragments may be detected using a charge-coupled device (CCD) 152 via some form of optics 156, wherein a plurality of energy detecting elements (e.g., pixels) 154 capture at least a portion of the emitted energy from the labeled fragments. In one aspect, an electronic signal is generated by the CCD 152 that is approximately proportional to the relative abundance of the fragments in the sample being measured.

A readout electronics assembly 158 is configured to perform readout operations to acquire the electronic signal generated by the CCD 152 in response to the fragments. In various embodiments, some of the information that may be determined through signal readout and subsequent resolution and peak identification may include determination of the relative abundance or quantity of each fragment population. The spatial resolution of the detected signal allows determination of the position on the sample platform from which the signal was emitted. Thus, by identifying the type of a fiber associated with that position, one can determine the type of fragments attached thereto. Such information facilitates determination of the sequence or composition of the sample using various known base sequence resolution techniques. It will further be appreciated by one of skill in the art that the exemplified signal distribution may represent one or more nucleic acid fragments for which the relative abundance of each fragment may be evaluated based, in part, upon the determination of the relative area of an associated peak in the signal distribution. The present teachings may therefore be integrated into existing analysis approaches to facilitate peak evaluation and subsequent integration operations typically associated with sequence analysis.

In various embodiments, the readout of the signal from the CCD 152 and selected control of the CCD 152 may be advantageously performed by a controller 160. The controller 160 may be configured to operate in conjunction with one or more processors and/or one or more other controllers. Such controller and processor's components may include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables. Furthermore, the controller 160 may output a processed signal or analysis results to other devices or instrumentation where further processing may take place.

In one aspect, the present teachings relates to a clock driver 162 that provides various clocked signals to the CCD 152 and/or the readout 158 so as to allow coordination of the manner in which charge is collected and read out from the CCD. The clock driver 162 may be configured to be controllable by the controller 160 such that the various clocked signals can be advantageously adjusted to suit the operating parameters of a given biological analysis system. Some of the possible manners in which the signals can be adjusted are described below in greater detail. Such a capability to adjust some of the operating parameters of the CCD can provide a significant advantage over conventional biological analysis systems where the operating parameters of the CCD and the related components are typically fixed when installed in the analysis system.

In various embodiments, some of the information that may be determined through signal (from feature) resolution and peak identification may include determination of the relative abundance or quantity of each fragment population. Evaluation of the signals may further be used to determine the sequence or composition of the sample using various known base sequence resolution techniques. It will further be appreciated by one of skill in the art that the exemplified signal distribution may represent one or more nucleic acid fragments for which the relative abundance of each fragment may be evaluated based, in part, upon the determination of the relative area of an associated peak in the signal distribution. The present teachings may therefore be integrated into existing analysis approaches to facilitate peak evaluation and subsequent integration operations typically associated with sequence analysis.

Figure 2A:
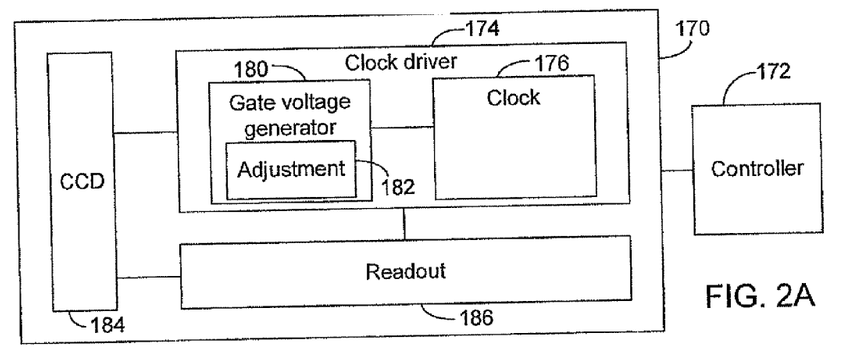
FIGS. 2A-C illustrate various embodiments of a detector adapted to allow adjustments of the way a CCD is operated.
Figure 2B:
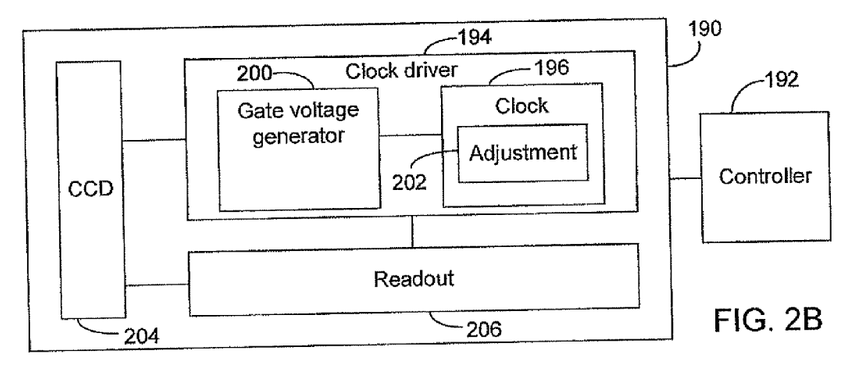
Figure 2C:
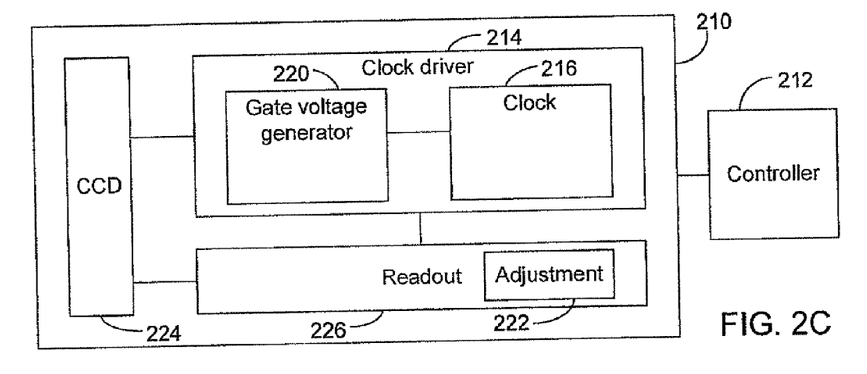

FIGS. 2A-C illustrate block diagrams of various embodiments of detectors configured to allow the various adjustments in the manner in which the CCD is operated and read out. FIG. 2A illustrates one embodiment of a detector 170 controlled by a controller 172. The detector 170 comprises a clock driver 174 that includes a clock 176 and a gate voltage generator 180. The clock 176 may comprise an internal clock, or may be sourced in from an external location. The clock 176 and the gate voltage generator 180 may be combined as a singular unit, or may be configured as separate units.

In one aspect, the gate voltage generator 180 includes an adjustment component 182 that allows adjustments of gate voltage signals supplied to a CCD 184. An exemplary manner in which such adjustment may be achieved is described below in greater detail.

As shown in FIG. 2A, a readout component 186 is functionally coupled to the CCD 184 so as to allow reading out of signals therefrom. An exemplary manner in which the readout of the CCD occurs is described below in greater detail.

FIG. 2B illustrates one embodiment of a detector 190 controlled by a controller 192. The detector 190 comprises a clock driver 194 that includes a clock 196 and a gate voltage generator 200. The clock 196 may comprise an internal clock, or may be sourced in from an external location. The clock 196 and the gate voltage generator 200 may be combined as a singular unit, or may be configured as separate units.

In one aspect, the clock 196 includes an adjustment component 202 that allows adjustments of clock signals supplied the gate voltage generator 200. An exemplary manner in which such adjustment may be achieved is described below in greater detail. The gate voltage generator 200, in response to the clock signals, generates and provides gate signals to a CCD 204. In certain embodiments, varying of the clock signal varies a gate drive impedence, thereby causing the gate signal to be varied.

As shown in FIG. 2B, a readout component 206 is functionally coupled to the CCD 204 so as to allow reading out of signals therefrom. An exemplary manner in which the readout of the CCD occurs is described below in greater detail.

FIG. 2C illustrates one embodiment of a detector 210 controlled by a controller 212. The detector 210 comprises a clock driver 214 that includes a clock 216 and a gate voltage generator 220. The clock 216 may comprise an internal clock, or may be sourced in from an external location. The clock 216 and the gate voltage generator 220 may be combined as a singular unit, or may be configured as separate units.

In certain embodiments, the clock 216 provides one or more clock signals to the gate voltage generator 220. The gate voltage generator 220, in response to the clock signals, generates and provides gate signals to a CCD 224.

As shown in FIG. 2C, a readout component 226 is functionally coupled to the CCD 224 so as to allow reading out of signals therefrom. An exemplary manner in which the readout of the CCD occurs is described below in greater detail.

In one aspect, the readout component 226 includes an adjustment component 222 that allows adjustment of a manner in which the CCD 224 is read out. An exemplary manner in which such adjustment may be achieved is described below in greater detail.

FIGS. 3A-D now illustrate an exemplary manner in which gate voltages may be applied to the CCD in a selected manner so as to allow charge collection and transfer. The exemplary CCD depicted is configured to operate in a three-phase mode. It will be appreciated that other forms and types of CCDs operate by selected application of gate voltages. Thus, the concepts disclosed herein are also applicable to other forms and types of CCDs without departing from the spirit of the present teachings.

As shown in a sectional representation in FIGS. 3A-D, a CCD comprises a substrate layer 232 and an oxide layer 232 that insulates the substrate layer 232 from a plurality of gates 236a-d. Application of voltages on the gates 236a-d in selected manners cause formation of a potential 240 having different profiles. Thus, exemplary potential configurations 230a-d of FIGS. 3A-D correspond to "snapshots" of the potential profiles at different times during an exemplary charge transfer process.

Figure 3A:
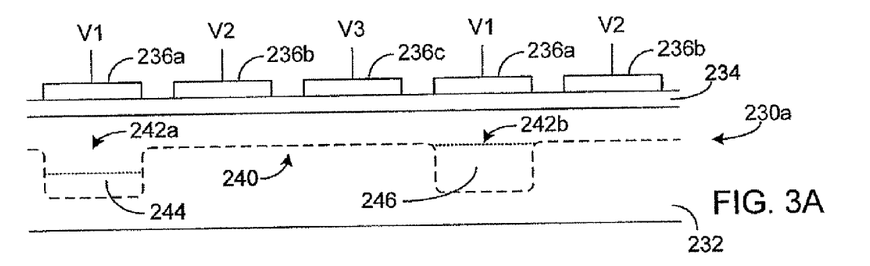
FIGS. 3A-D illustrate an exemplary charge collection and transfer process in an exemplary pixel of a CCD.

In FIG. 3A, application of a voltage V1 at the gate 236a causes a formation of a potential well 242a that allows collection of charge 244 therein. FIG. 3A also shows an adjacent pixel where application of voltage V1 causes formation of a potential well 242b that allows collection of charge 246 therein. The amount of charge collected in a given well depends in part on the intensity of the incident signal at the pixel corresponding to the given well, and also on the duration of time (exposure time) for which the potential well 242a (or b) is formed. Thus in FIG. 3A, the collected charge 244 in the well 242a is depicted as being less than the charge 246 in the well 242b to illustrate that the pixel associated with the well 242b has received a more intense incident signal than that of the well 242a.

As is known in the art, the amount of charge collected in a given well is representative of the intensity of the incident signal. Thus by measuring the collected charge of a given well (pixel), one can determine the relative intensity of signals impinging on the given pixel. Such a measurement then allows one to determine the positions and/or relative abundances of various species that make up a biological sample being analyzed.

Figure 3B:
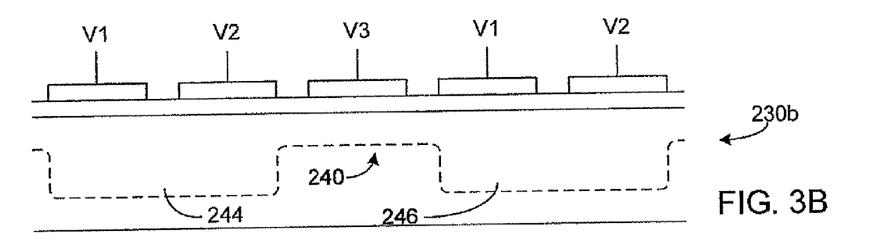
Figure 3C:
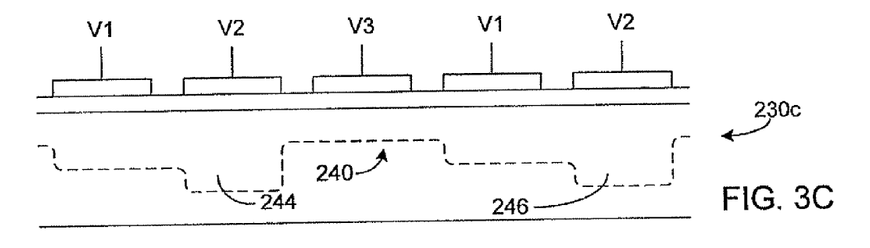
Figure 3D:
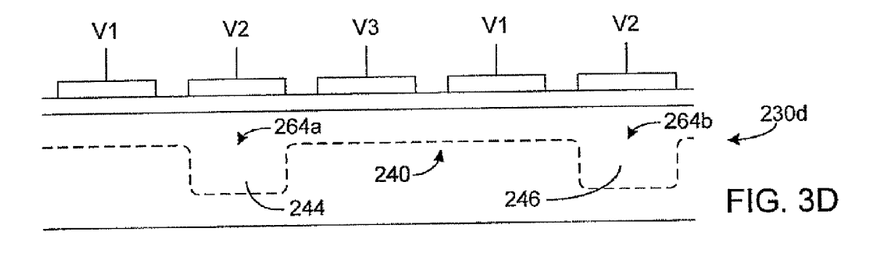

FIGS. 3B-D illustrate one exemplary method of transferring of the collected charge to allow such measurement. As shown in the potential configuration 230b of FIG. 3B, application of voltage V2 causes the potential 240 to change such that the charge 244 "spills" over to the adjacent space associated with the adjacent gate 236b.

FIG. 3C illustrates the potential configuration 230c where the voltage V1 is changed so as to cause its corresponding well depth becomes "shallower" thereby causing the charge 244 to drain into the well corresponding to the gate 236b. In FIG. 3D, the potential configuration 230d shows that the voltage V1 is further changed such that substantially all of the charge 244 is now transferred to a well 264a associated with the gate 236b. One can see that repetition of such a transfer cycle allows the collected charge 244 to be transferred (also referred to as "shifted") from the collection pixel.

It will be appreciated that the charge transfer sequence depicted in FIGS. 3A-D is exemplary only, and is not in any way intended to limit the scope of the present teachings. As previously stated, other forms and types of CCDs may use different potential profiles for collection and transfer purposes. As is known in the art, however, CCDs in general are operated by application of some form of a voltage via some form of a gate structure to form a desired potential profile.

As is also known in the art, the operation of the CCD in the foregoing manner can cause generation charges and other effects that manifest themselves as a noise. For example, a dark current is generated in the pixel during the charge collection process. In another example, spurious charge can be generated in response to the application of gate voltages during the charge transfer process.

In one aspect, the present teachings relates to a CCD detector system that can be configured to allow at least some of the parameters associated with the application of the gate voltages. Such a capability is advantageous over conventional CCD systems that typically have the operating parameters generally fixed when installed in biological analysis devices. By allowing the CCD operating parameters to be changed, one can configure a given biological analysis device to operate in a desirable manner in terms of a desired measurement performance and noise.

Figure 4:
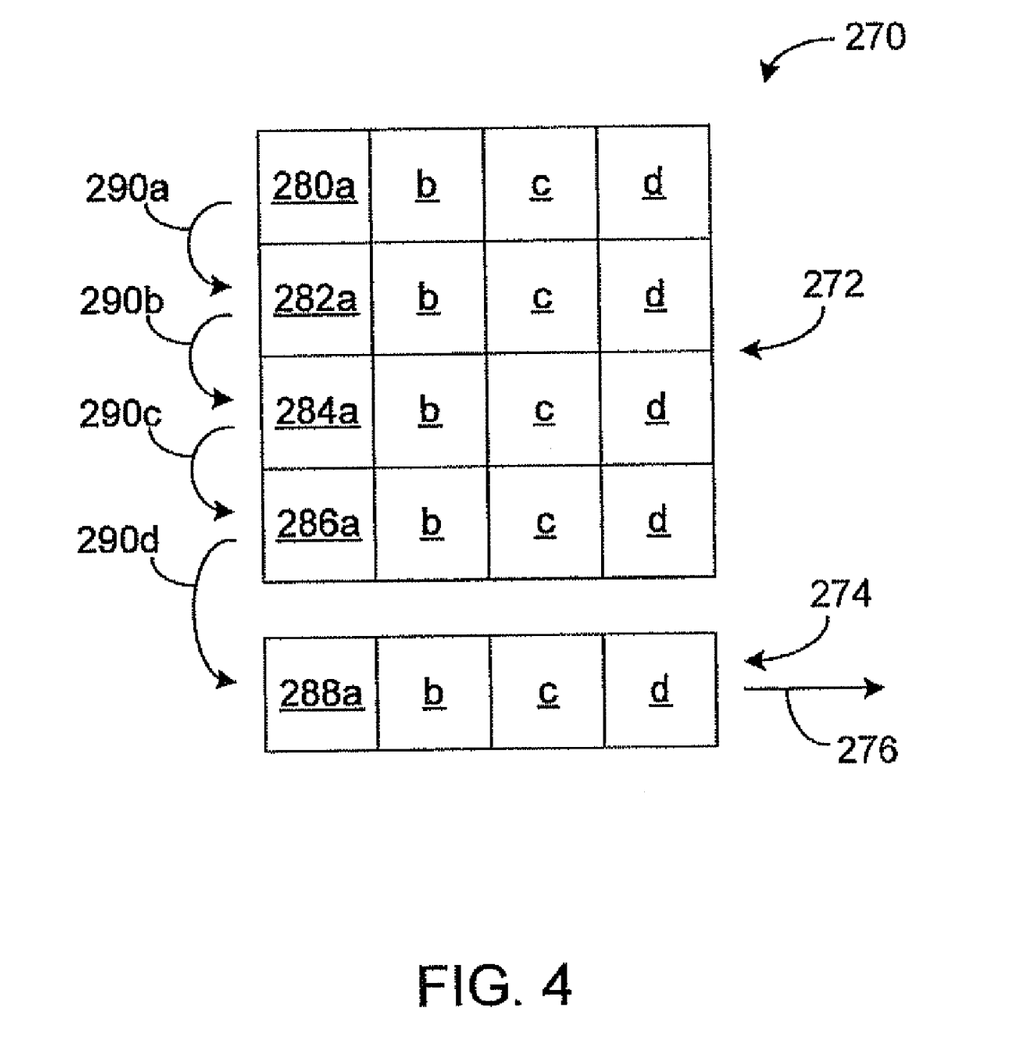
FIG. 4 illustrates an exemplary array of pixels and an exemplary manner in which charges can be read out therefrom.

The exemplary charge transfer process described above in reference to FIGS. 3A-D can be adapted to allow transfer of collected charges associated with an array of pixels in a number of ways. FIG. 4 illustrates one such transfer implementation associated with an exemplary CCD 270 having a two dimensional pixel array 272. The exemplary array 272 is depicted as having four exemplary rows 280, 282, 284, 286 of four pixels a-d. It will be understood that the exemplary CCD 270 depicted is for descriptive purpose, and in no way intended to limit the scope of the present teachings.

As shown in FIG. 4, the exemplary CCD 270 further comprises an output register 274 that receives a row of charges and subsequently shifts out the received charges. In such a configured CCD 270, the rows of charges are shifted "vertically" as depicted by arrows 290a-d. Thus, charge associated with pixel 280a is shifted into pixel 282a via the transfer process 290a. Simultaneously, charge that is in pixel 282a is shifted into pixel 284a via the transfer process 290b, and so on.

The charge associated with pixel 286a is shifted into a corresponding output register 288a via the transfer process 290d. Simultaneously, the charge that is in the output register 288a is shifted into output register 288b, and so on. Thus in the exemplary CCD of FIG. 4, a CCD output (depicted by an arrow 276) comprises packets of charges associated with each pixel of the array 272. Because the charge transfer of the rows are frequently illustrated as being "vertical," such transfers are commonly referred to as vertical shifts even though the CCD may not be oriented in such a manner. Similarly, the charge transfer associated with the output register 274 is commonly referred to as "horizontal" shifts. It will be appreciated that references to "vertical" and "horizontal" in the description herein is in no way intended to limit the scope of the present teachings.

Figure 5:
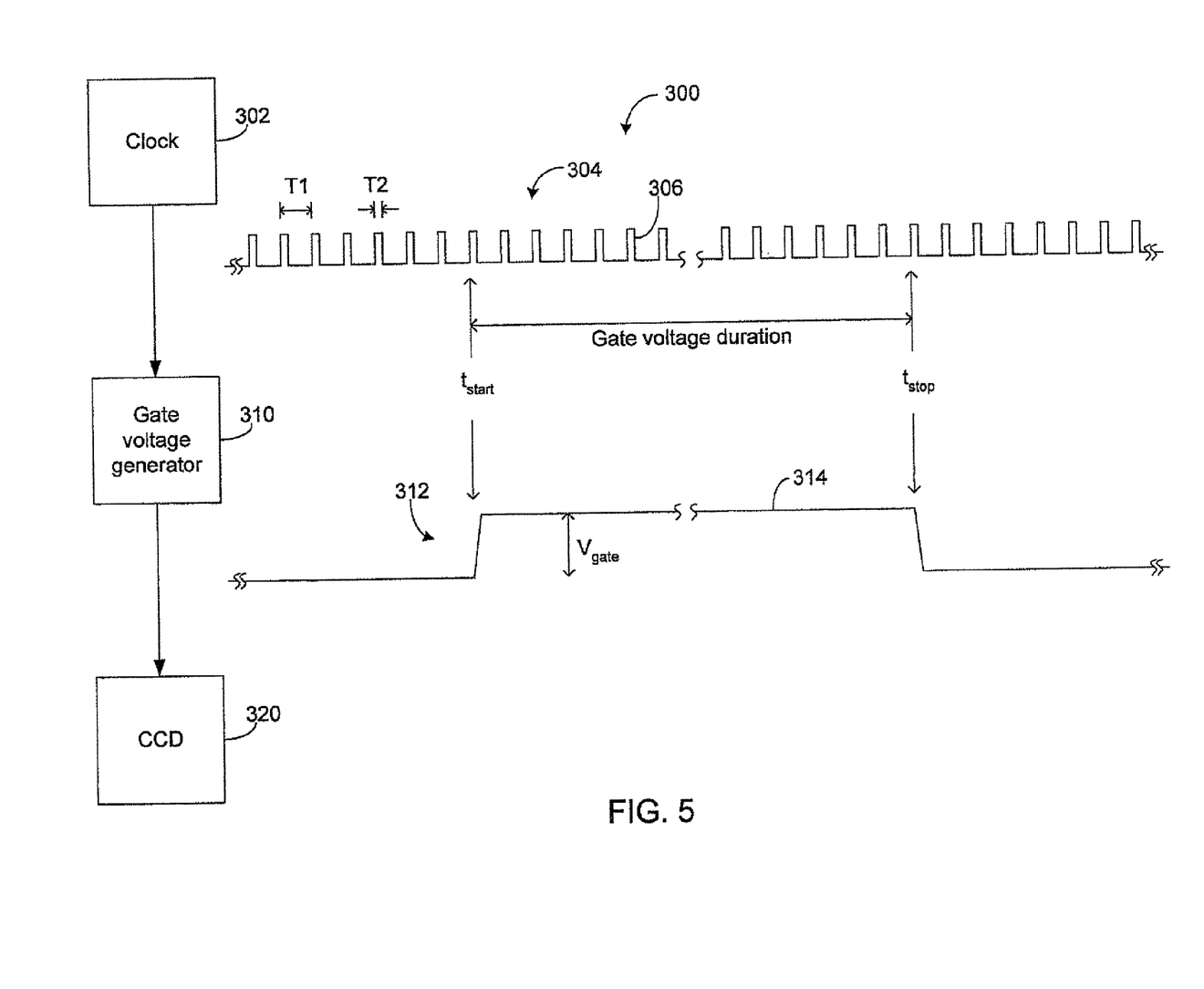
FIG. 5 illustrates an exemplary generation of a gate voltage signal that facilitates the readout process of the CCD.

FIG. 5 now illustrates an exemplary detector configuration 300 for generating an exemplary gate voltage. In such a configuration, a clock 302 provides a clock signal 304 to a gate voltage generator 310. In response to the clock signal 304, the gate voltage generator 310 generates a gate voltage signal 312 and provides it to a CCD 320.

As illustrated in FIG. 5, the clock signal 304 comprises a plurality of pulses 306 temporally spaced at a period of T1, and each pulse having a temporal width of T2. One aspect of the present teachings relates to a CCD detector configured to allow manipulation of the clock signal to facilitate adjustment(s) of temporal aspects of the manner in which the CCD is operated and read out. The clock signal adjustment may include, but is not limited to, adjustments of the clock period T1 and/or the clock pulse width T2. An exemplary manner in which the clock signal can be adjusted is described below in greater detail.

As also illustrated in FIG. 5, one implementation of the gate voltage signal 312 comprises a voltage step plateau 314 having an amplitude of $V_{gate}$. The gate voltage 314 may represent any of the exemplary gate voltages described above in reference to FIGS. 3A-D, as well as other waveforms described herein. The gate voltage 314 is depicted to begin at $t_{start}$ and end at $t_{stop}$. In certain embodiments, the $t_{start}$ is triggered at a selected first pulse of the clock signal and ends at a selected second pulse of the clock signal. The gate voltage duration ($t_{stop}$-$t_{start}$) can be defined by a multiple (M) of the clock period T1. Thus, the gate voltage duration can be adjusted by changing the value of M and/or changing the value of the clock period T1.

In one aspect, the present teachings relates to the gate voltage generator 310 being configured to allow adjustment of the value of $V_{gate}$. An exemplary manner in which the gate voltage can be adjusted is described below in greater detail.

Figure 6:
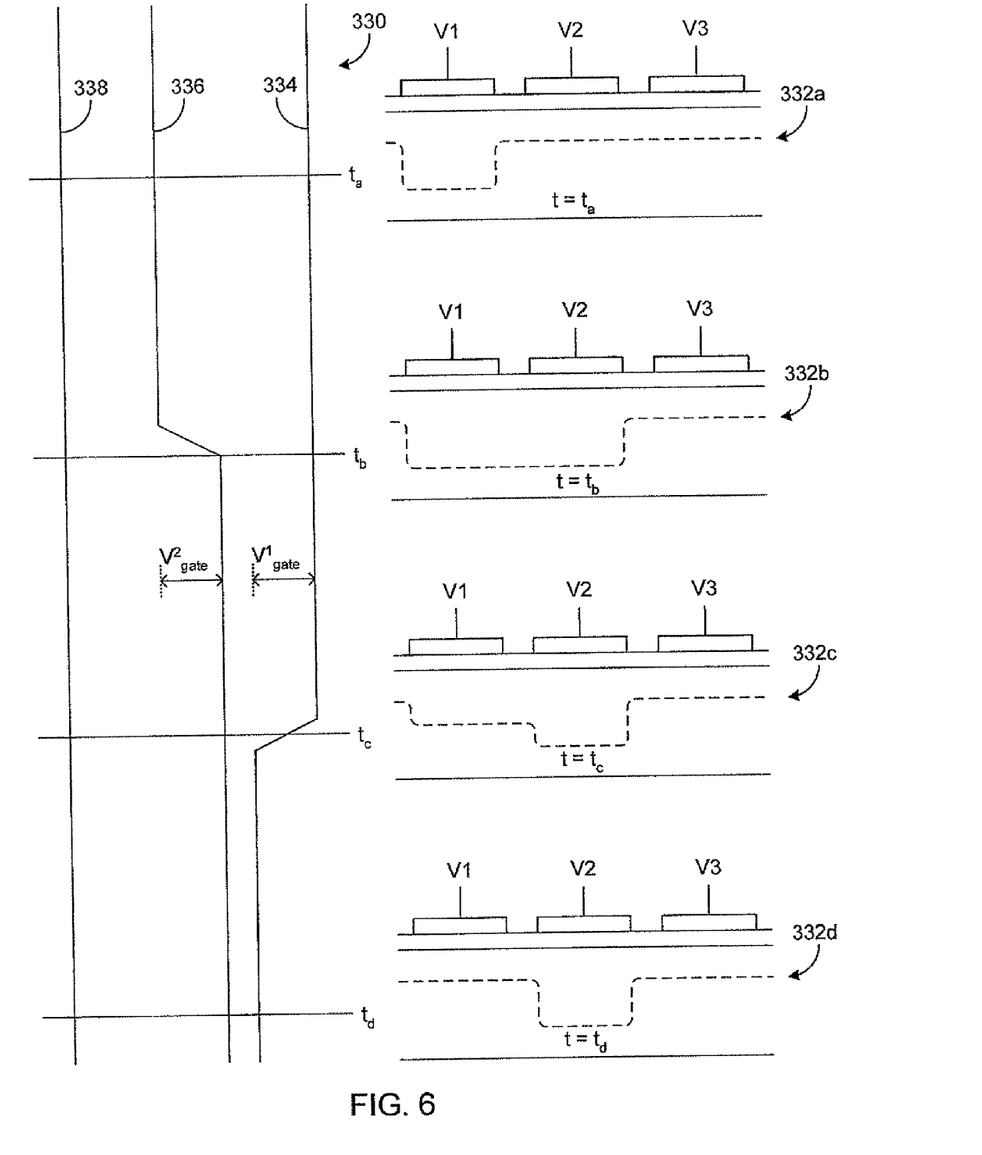
FIG. 6 illustrates an exemplary sequence of application of gate voltage signals that induce the charge transfer process.

FIG. 6 now illustrates how the exemplary gate voltage 312 of FIG. 5 can be implemented to perform the exemplary charge transfer operation described above in reference to FIGS. 3A-D. In FIG. 6, various potential configurations 332a-d corresponding to various values of time t are depicted. Also illustrated are time dependent voltage waveforms corresponding to voltages V1, V2, and V3. For the purpose of description, the voltages V1, V2, and V3 are either in "high" state or "low" state, with the low state being a reference voltage. It will be appreciated that any voltage state(s) associated with a given voltage may be used as a reference without departing from the spirit of the present teachings. It will also be appreciated that in certain embodiments, a given voltage may increase negatively to cause the formation of a corresponding potential profile effect, again without departing from the spirit of the present teachings.

As shown in FIG. 6, at time $t=t_a$ corresponding to the potential configuration 332a, voltage V1 is at the high state with a magnitude of $V^1_{gate}$ with respect to the low state. Voltages V2 and V3 are at their respective low states, thereby causing a potential well to form adjacent the gate associated with V1. As previously described, such a potential well can be formed to collect the charges during an exposure. At time $t=t_b$ corresponding to the potential configuration 332b, voltage V1 remains at the high state, and voltage V2 has transitioned to its high state with a magnitude of $V^2_{gate}$ with respect to the low state. As previously described, such a transition causes the collected charge adjacent the V1 gate to "spill" over to the area adjacent the gate associated with V2 thereby initiating the charge transfer process.

At time $t=t_c$ corresponding to the potential configuration 332c, voltage V2 remains at its high state, and voltage V1 is in a transition to its low state. Such a voltage configuration causes the potential level adjacent the V1 gate to "rise" thereby transferring its charge to be further transferred to the area adjacent the V2 gate. At time $t=t_d$ corresponding to the potential configuration 332d, voltage V2 remains at its high state, and voltage V1 is in its low state. Because voltage V3 remains in its low state, a potential well adjacent the V2 gate now contains the charge transferred from the collection well adjacent the V1 gate. Further transfer of the charge can proceed to an area adjacent the V3 gate by a similar sequence of V3 and V2 voltage manipulations. And as previously described, the durations and magnitudes of the gate voltage waveforms V1, V2, and V3 may be adjusted in manners described herein to achieve various desired CCD performance parameters such as noise levels and the manner in which the wells are shifted. As further described below, one way to manipulate the gate voltages is to vary the impedances of a voltage output component.

It will be understood that the foregoing charge transfer scheme is exemplary to illustrate the role of the various gate voltages. Other gate voltage manipulation schemes, such as those using virtual phases, can be implemented as well using the techniques described herein.

Figure 7A:
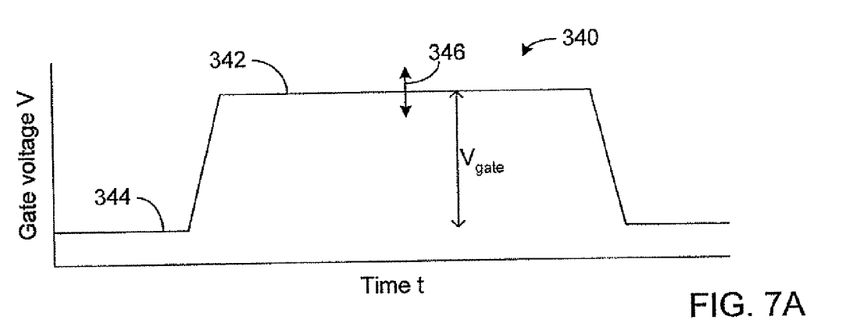
FIGS. 7A-C illustrate two exemplary manners in which the amplitude of the gate voltage signal could be adjusted so as to adjust the manner in which the charge transfer process occurs.
Figure 7B:
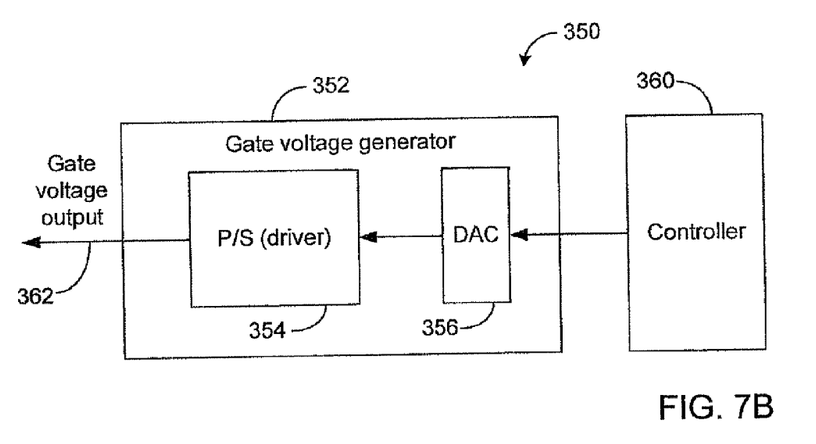
Figure 7C:
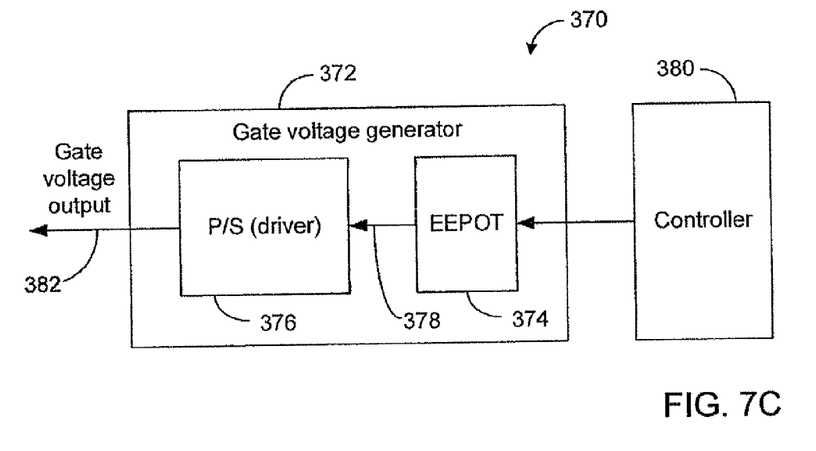

FIGS. 7A-C now illustrate how the amplitude of a gate voltage may be manipulated. FIG. 7A illustrates an exemplary gate voltage waveform 340 comprising a plateau 342 having an amplitude $V_{gate}$ with respect to a reference level 344.

As previously described, one aspect of the present teachings relates to the amplitude of the gate voltage being adjustable (as depicted by an arrow 346). One possible configuration 350 of achieving such an adjustability is illustrated in FIG. 7B. A gate voltage generator 352 is shown to comprise a power supply 354 that outputs a gate voltage signal 362. The magnitude of the gate voltage signal 362 can be adjusted by the power supply in response to an analog command signal from a DAC (digital-to-analog converter) 356. The DAC 356 receives a corresponding digital signal from a controller 360 configured to facilitate a desired gate voltage level change.

In certain embodiments, the DAC 356 comprises a commercially available MAX-528 Octal 8-bit with buffer. The power supply/gate driver 354 comprises a commercially available LT1207 current-feedback amplifier.

FIG. 7C illustrates another possible configuration 370 that allows the adjustability of the gate voltage amplitude. A gate voltage generator 372 is shown to comprise a power supply/gate driver 376 that outputs a gate voltage voltage output 382. The amplitude of the driver output can be adjusted by an EEPOT (electrically erasable potentiometer) 374 (as indicated by arrow 378) under the control of a controller 380. The EEPOT 374 acting as a voltage modulator by changing the output impedance can thus allow control of the amplitude of the gate voltage signal 382. The controller can be configured to issue commands to the EEPOT 374 in a manner that facilitates a desired gate level change.

In certain embodiments, the EEPOT 374 comprises a commercially available XICOR X-9116, and the driver 376 comprises a commercially available LT1207 current-feedback amplifier.

In certain embodiments, adjustment of the gate voltage can be adjusted via an analog multiplexer operated in a demultiplexing mode. A selected one of multiple analog voltage signals can be selected as a source of the gate voltage.

Figure 8A:
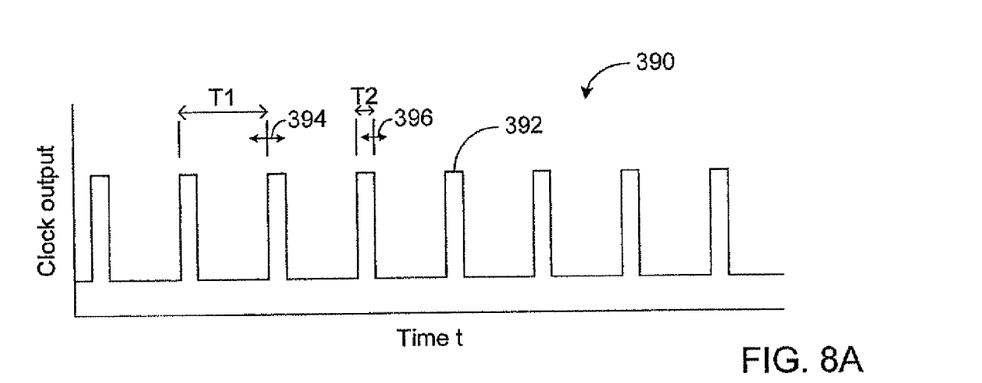
FIGS. 8A-B illustrate an exemplary manner in which the duration of the gate voltage signal could be adjusted so as to adjust the manner in which the charge transfer process occurs.
Figure 8B:
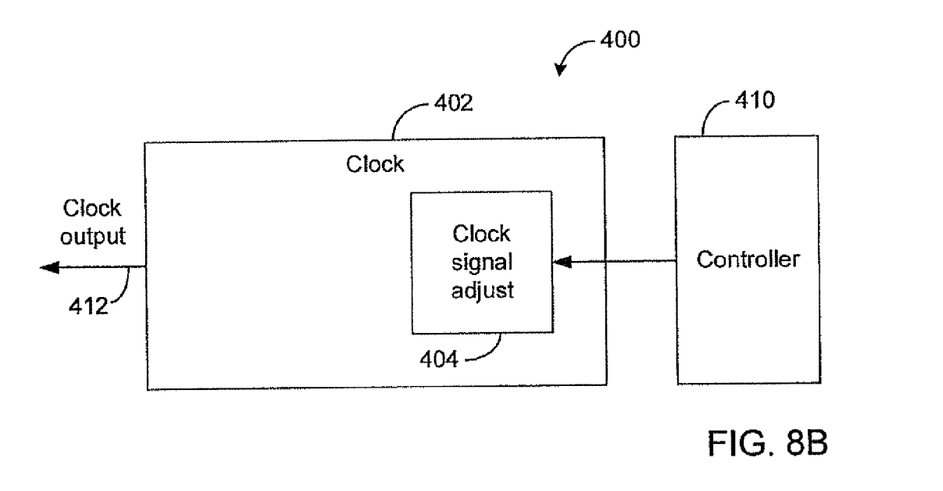

FIGS. 8A and B now illustrate how the temporal parameter of the clock signal can be adjusted to thereby facilitate temporal adjustments of the various gate voltage signals supplied to the CCD. FIG. 8A illustrates a segment of an exemplary clock signal 390 comprising a plurality of pulses 392.

As previously described, one aspect of the present teachings relates to the period T1 of the clock signal 390 being adjustable (as depicted by an arrow 394). The temporal width T2 of the pulse 392 may also be adjusted (as depicted by an arrow 396) if desired. One possible configuration 400 that facilitates such an adjustability is illustrated in FIG. 8B. A clock 402 is shown to comprise a clock signal adjustment component 404 that is under the control of a controller 410. As previously described, the clock may comprise its own internal clocking source, or it may receive a clock signal from an external source. The clock adjustment component 404 thus adjusts the clock signal from the internal or the external source such that the clock 402 outputs an adjusted clock signal 412 to a CCD (not shown) and/or a readout component (not shown). In certain embodiments, the clock adjustment component receives an adjustment-inducing signal from the controller 410 configured to facilitate a desired clock signal change. In certain embodiments, a number of different clocks could have their speeds adjusted, including timings for vertical, horizontal, and double correlated sample and hold.

Figure 9A:
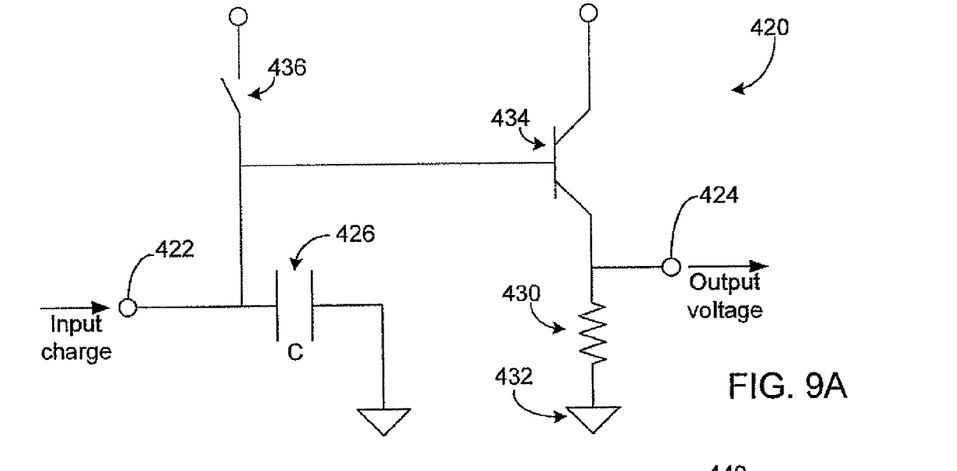
FIGS. 9A-C illustrate an exemplary manner in which the processing of charge transferred from the pixels could be adjusted so as to adjust the rate at which the charge processing occurs.
Figure 9B:
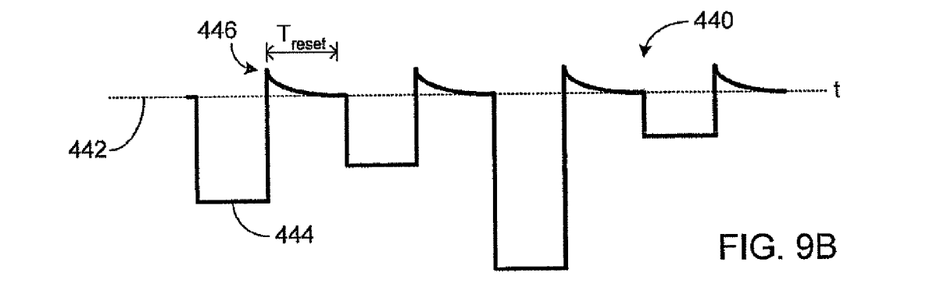
Figure 9C:
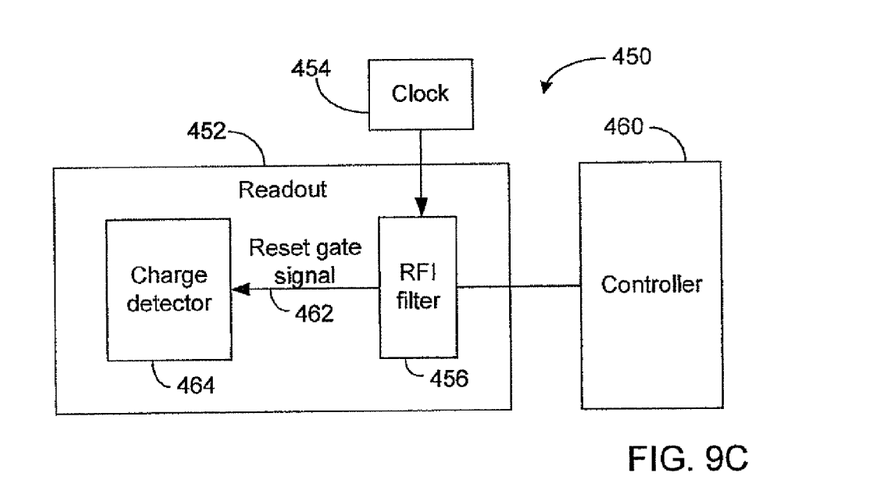

FIGS. 3-8 generally addresses how various clock and gate voltage signals can be adjusted to achieve a desired performance/noise of the operation of a CCD associated with a biological analysis device. FIGS. 9A-C now illustrates how a readout component may also be adjusted to improve the manner in which the CCD can be read out. As described above in reference to FIG. 2C, one aspect of the present teachings relates to the readout assembly 226 having the adjustment component 222.

As shown in a FIG. 9A, a readout assembly may comprise an exemplary charge-to-voltage conversion circuit 420 having an input 422 and an output 424. It will be appreciated that the exemplary circuit 420 is a simplified depiction of the conversion process. Various embodiments of the readout assembly may utilize different implementations of the conversion circuit without departing from the spirit of the present teachings.

In certain embodiments, the conversion circuit receives, at the input 422, a packet of charge Q from the readout register of the CCD (not shown). The charge Q is temporarily stored at a sense capacitor 426 having a capacitance C, thereby yielding a voltage V=Q/C with respect to a potential reference 432. A parallel circuit via a transistor 434 and a load resistor 430 allows the voltage V to be output at the output 424. In some embodiments, such conversion is performed as part of the CCD's FET amplifier.

In certain embodiments, once the output voltage V is read out, the sense capacitor 426 is cleared of the temporarily stored charge to receive the next packet of charge from the CCD. As shown in the exemplary circuit 420 of FIG. 9A, one way to clear the sense capacitor 426 is to close a switch 436 to allow restoration of the sense capacitor voltage to a reference voltage. Such a resetting process can cause a feedthrough effect as a result of a capacitive coupling through the transistor 434. Such a feedthrough signal can cause the output voltage V to manifest an overshoot past the reference voltage during the reset process.

FIG. 9B illustrates an exemplary output voltage V trace 440 having such an overshoot. The exemplary trace 440 is depicted by four exemplary cycles of the charge-to-voltage conversion processes. The voltage V trace 440 is referenced with respect to a reference voltage level 442. The first cycle comprises a dip 444 in the voltage V caused by the first charge packet from the CCD, and the "depth" of the dip 444, often referred to as a pixel level, is proportional to the first charge packet magnitude. Thus, The duration of the pixel level is determined by the time during which the charge is stored in the sense capacitor.

At the end of the pixel level duration, the sense capacitor resetting occurs in a manner described above in reference to FIG. 9A, thereby causing an overshoot 446. The peak of the overshoot 446 is often referred to as a reset feedthrough level. The amplitude of the overshoot peak can be significant when compared to the reference level. The overshoot eventually decays to the reference level, and a characteristic time $T_{reset}$ associated with such a decay may determine when the next cycle can begin. Thus in certain applications, it may be advantageous to reduce the reset time $T_{reset}$ thereby allowing the readout to proceed at a faster pace.

In some embodiments, the readout assembly includes a filter that filters out high frequency noise that is typically intrinsically present in the output amplifier. Thus in certain applications, the time constant ($T_{reset}$) may be increased to decrease the high frequency noise. A design may consider such a benefit against an increase in an associated readout time.

FIG. 9C illustrates one possible way of achieving such an adjustment in the reset time. An exemplary configuration 450 comprises a readout assembly 452 having a charge detector 464 such as that described above in reference to FIG. 9A. The charge detector 464 receives a reset gate signal 462 from a clock 454 via a filter 456. In certain embodiments, the reset time is affected by the waveform of the reset gate signal 462, and the filter 456 at least to some extent controls the reset gate signal's waveform. Thus, in such embodiments of the readout assembly, the filter 456 can be adapted to be controlled by a controller 460 that issues an adjustment-inducing signal so as to facilitate a desired change in the manner in which the filter operates.

In certain embodiments, the filter 456 can be adjusted such that the reset time of the charge-to-voltage conversion results in operating frequency that ranges from approximately 20 kHz to approximately 100 Mhz.

In some embodiments such as electron multiplying detectors, various foregoing design features can be incorporated to change the gain and/or noise levels of different parts of an imager. As an example, at parts of an imager where signals are relatively high, gain can be set relatively low such that excess noise is relatively low. At parts of an imager where signals are relatively low, gain can be set relatively high such that read noise is relatively low.

In various embodiments, one or more of the above-described operating parameters can be adjusted or configured to improve the performance of one or more functionalities of a detector. In some situations, such adjustment may affect the performance of one or more other functionalities; thus, the adjustment can be made to "tune" the overall desired performance of the detector.

For example, charge collection duration can be adjusted in view of parameters such as full-well resolution, speed of operation, and noise associated with pixels, readout registers, and/or readout operations. For example, when the incident light intensity is sufficient, a given well will likely fill relatively quickly to provide sufficient number of electrons; and thus the speed of operation can be increased accordingly. Conversely, speed of operation may be reduced in situations where the incident light intensity is relatively low, so as to provide greater time for sufficient photoelectrons to be collected.

In devices such as electron multiplying CCDs (EMCCDs), the electron multiplying gain can be adjusted to provide sensitivity that may be lacking due to a relatively fast operation. For example, a relatively fast operation may not allow the pixel well sensitivity to be fully utilized. If such a mode of operation is necessary for whatever reason, the electron multiplying feature, if present, can be used to boost the read out charges from the readout registers.

Figure 10A:
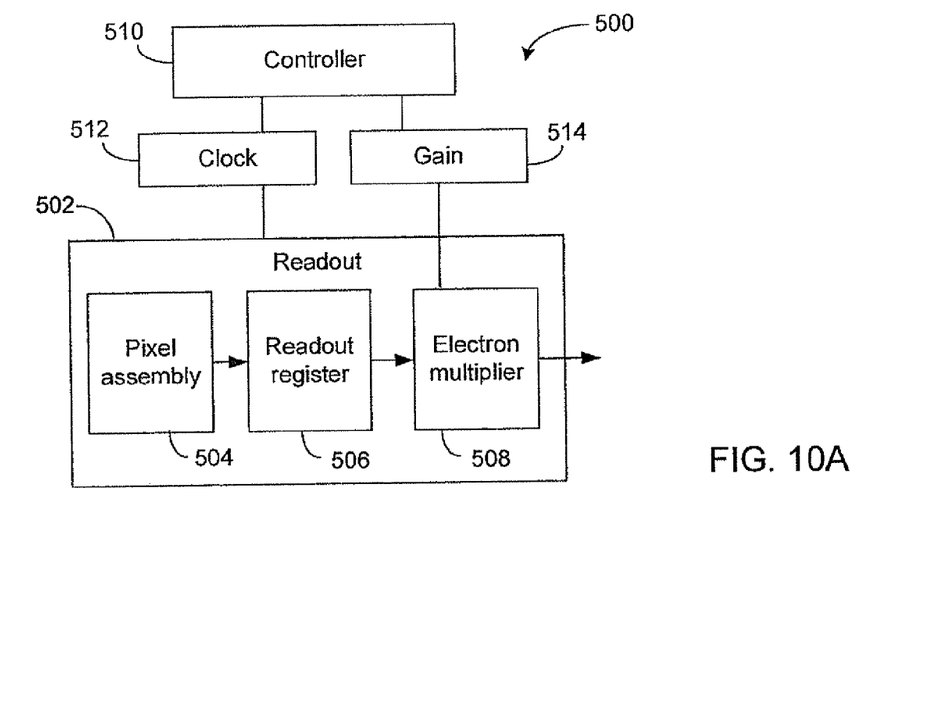
FIG. 10A shows an example configuration of a detector having an electron multiplying feature whose gain can be controlled with respect to clocking speed.

Thus, in an example detector configuration 500 shown in FIG. 10A, a readout component 502 can include a pixel assembly 504 from which charge is read out to a readout register 506. The charge from the readout register can then be multiplied by a multiplying component 508 such as an electron multiplier. The readout component 502 is shown to be under the control of a control component 510 that includes a clocking component 512 and a gain control component 514. The control component 510 can be configured to adjust the clocking speed and/or the gain of the electron multiplier so as to achieve a desired configuration as described above.

In devices having anti-blooming features, a binary type switching can be implemented so as to allow switching between anti-blooming mode and full well modes. For example, when blooming is likely to occur, and/or when full well sensitivity is not a critical factor, the anti-blooming feature can be turned on at the expense of sacrificing some well depth. Conversely, if the full well sensitivity is required, and/or when blooming is not likely to occur, the binary switch can be configured to turn off the anti-blooming feature.

Figure 10B:
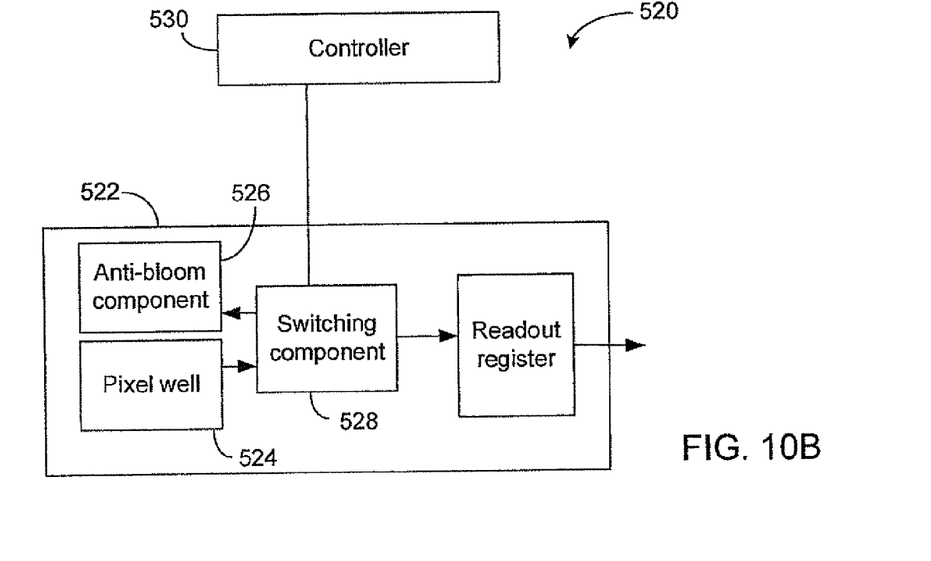
FIG. 10B shows an example configuration of a detector having an anti-bloom feature and a switching component that allows switching between anti-bloom mode of operation and a full well mode of operation.

Thus, in an example detector configuration 520 shown in FIG. 10B, a detector 522 can include a pixel well 524 and an associated anti-bloom component 526. The detector 522 is shown to further include a switching component 528 under the control of a control component 530. The control component 530 and the switching component 528 can be configured to allow either in a full well mode of operation or in an anti-bloom mode of operation, so as to achieve a desired configuration as described above.

In another example, readout noise can be balanced with respect to the speed of readout operation. In some devices, readout noise associated with amplification of the CCD output charge increases with the sampling frequency (operating speed). Thus, for example, the readout speed can be adjusted so that the resulting noise is within some acceptable range. Similar noise versus readout speed balancing can be extended with respect to other circuits associated with the readout operation.

Although the above-disclosed embodiments of the present invention have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. A system for detection, interrogating a biological sample using a probe array configured to be responsive to a plurality of particles wherein the probe array generates one or more identifiable signals following interaction with the biological sample particles and wherein the biological sample composition is resolved, at least in part, by identifying the signals associated with each constituent probe of the array, the system comprising:
    a segmented detector configured to detect at least a portion of one or more identifiable signals associated with each biological sample wherein the position of each signal on a plurality of pixels form an optical image;
    a clock driver that provides one or more gate voltages to the pixels so as to affect a manner in which collected charges are transferred from the pixels;
    a readout component that reads out the charges transferred from the pixels to thereby yield an output signal corresponding to each pixel wherein the output signal is representative of the magnitude of the pixel's collected charge; and
    a controller configured to control at least one of the clock driver and the readout component so as to allow selective adjustment of a manner in which the gate voltages is applied to the pixel or the manner in which the readout occurs so as to allow different readout of different areas of the segmented detector.

2. The system according to claim 1 wherein the particle is a nucleic acid fragment.

3. The system according to claim 2 wherein the nucleic acid fragment comprises DNA.

4. The system according to claim 2 wherein the nucleic acid fragment comprises a fluorescent label.

* * * * *